United States Patent [19]
Gilboa et al.

[11] Patent Number: 5,646,785
[45] Date of Patent: Jul. 8, 1997

[54] HELMET WITH WIND RESISTANT VISOR

[75] Inventors: Pinhas Gilboa, Haifa; Tal Maoz, Nofit; Shimon Levy, Kiryat Motzkin; David Sendowski, Kiryat Haim, all of Israel

[73] Assignee: Elbit Ltd., Haifa, Israel

[21] Appl. No.: 335,382

[22] Filed: Nov. 3, 1994

[30] Foreign Application Priority Data

Nov. 4, 1993 [IL] Israel ............................. 107502

[51] Int. Cl.⁶ ........................ G02B 27/14; A42B 3/18; A42B 3/22
[52] U.S. Cl. ..................... 359/632; 2/6.3; 2/6.5
[58] Field of Search ........................ 359/632, 630, 359/631; 2/6.1, 6.3, 6.7, 424; 345/8

[56] References Cited

U.S. PATENT DOCUMENTS

| | | | |
|---|---|---|---|
| H833 | 11/1990 | Brindle | 2/424 |
| 3,923,370 | 12/1975 | Mostrom | 359/630 |
| 4,028,739 | 6/1977 | Bell | 2/6 |
| 4,364,636 | 12/1982 | Ellis | 359/632 |
| 4,761,056 | 8/1988 | Evans et al. | 359/631 |
| 5,000,544 | 3/1991 | Staveley | 359/630 |
| 5,003,300 | 3/1991 | Wells | 340/705 |
| 5,005,221 | 4/1991 | Chen | 2/424 |
| 5,066,072 | 11/1991 | Letovsky | 434/61 |
| 5,091,997 | 3/1992 | Foehl | 2/424 |
| 5,157,794 | 10/1992 | Kamata | 2/424 |
| 5,187,502 | 2/1993 | Howell | 2/6 |
| 5,251,333 | 10/1993 | Tsook | 2/6.2 |
| 5,254,852 | 10/1993 | Filipovich et al. | 250/214 VT |
| 5,265,276 | 11/1993 | Kimberly | 2/6.2 |
| 5,341,242 | 8/1994 | Gilboa et al. | 359/631 |

FOREIGN PATENT DOCUMENTS

| | | |
|---|---|---|
| 290293 | 11/1988 | European Pat. Off. . |
| 475679 | 3/1992 | European Pat. Off. . |
| 576160 | 12/1993 | European Pat. Off. . |
| 2688661 | 9/1993 | France . |
| 3325250 | 1/1985 | Germany . |
| 2155762 | 10/1985 | United Kingdom . |
| 94/14349 | 7/1994 | WIPO . |

*Primary Examiner*—Georgia Y. Epps
*Assistant Examiner*—Ricky Mack
*Attorney, Agent, or Firm*—Cushman, Darby & Cushman IP Group of Pillsbury Madison & Sutro LLP

[57] ABSTRACT

A helmet system having a visor attached to a support bracket mounted on a helmet wherein the support bracket is formed with an extension operative to block the visor from lifting upwards when the visor is pushed toward the helmet by wind pressure while not obstructing the normal circumferential movement of said visor in the absence of wind pressure.

16 Claims, 4 Drawing Sheets

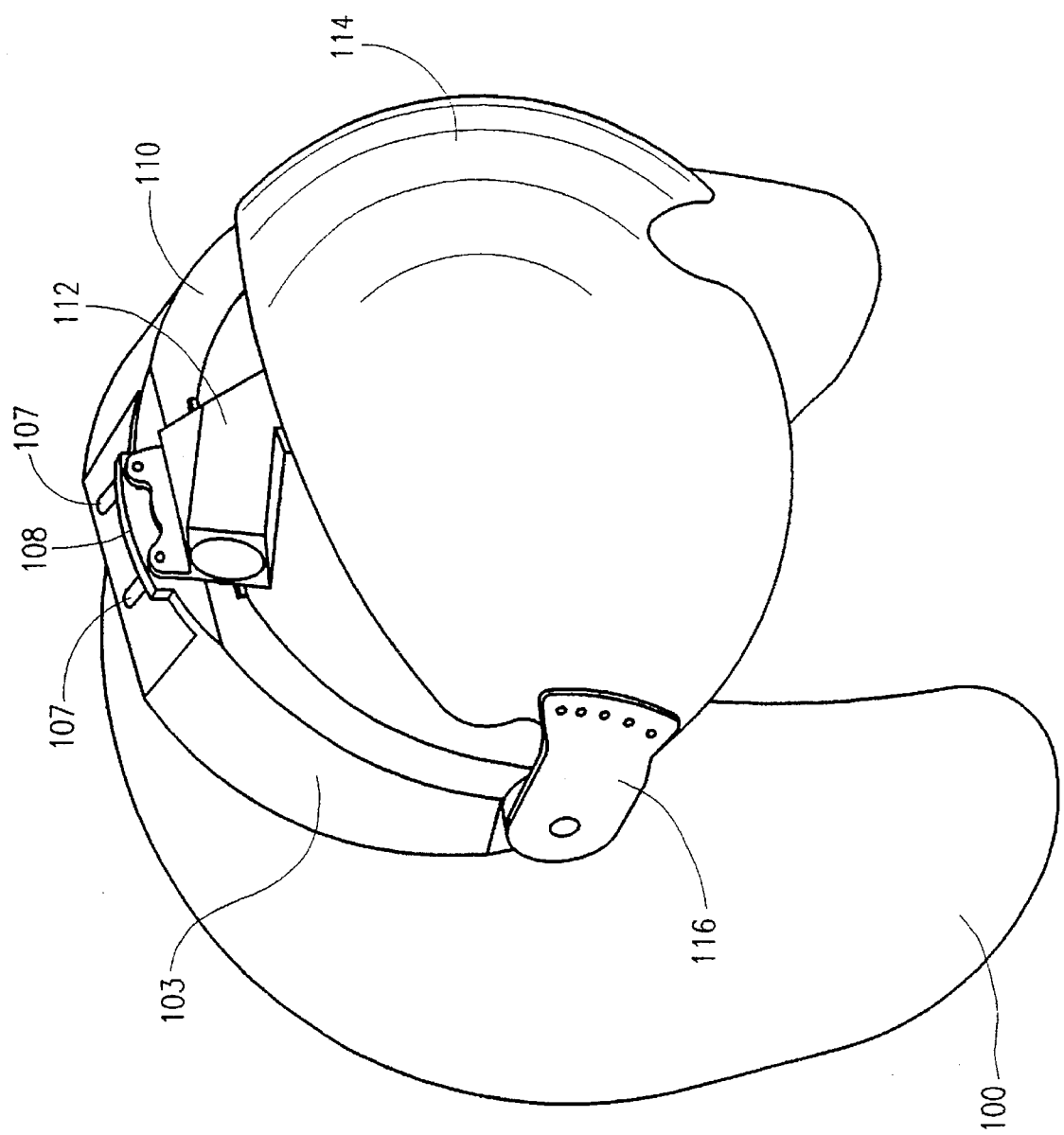

HELMET WITH WIND RESISTANT VISOR

FIELD OF THE INVENTION

The present invention relates to helmets, and more specifically to visor and helmet display mounting systems.

BACKGROUND OF THE INVENTION

Helmet mounted displays provide convenient and quick means for accessing vital flight information, particularly for fighter pilots where reaction time in response to certain stimuli is extremely important. Helmet mounted displays typically include an image source which is mounted on a helmet and projects an image onto a visor also mounted on the helmet. Such displays are described, for example, in U.S. Pat. Nos. 3,923,370 and 4,761,056.

The helmet of a fighter pilot is generally intended to protect his head from dangerous impact in situations such as a crash or circumstances of wind blast arising from a broken canopy. Typical helmets are constructed from a thin lightweight shell and a transparent polycarbonate visor. The helmet shell is relatively flexible to allow for comfortable donning and doffing.

In modern helmet mounted displays, the visor is an optical component whereby an image generated by an optical module is projected onto the visor and reflected towards the pilots eye. Hence, preventing visor deformation is critical for achieving good optical performance. Furthermore, visors used in such helmets are apt to lift upwards under strong wind pressure against the visor, experienced for example, when the aircraft's canopy is ruptured. Needless to say, it is important for visors to remain in place in the face of strong wind pressure.

One method of helmet construction which achieves a stable non-deforming visor uses a rigid shell as an optical platform, where both the visor and an optical module are attached to the shell. The rigidity of the shell prevents any deformations of the visor from arising. However, such a solution makes donning and doffing of the helmet inconvenient. Furthermore, the rigidness of the shell is achieved at the expense of extra, otherwise unnecessary weight that makes the helmet uncomfortable to wear for extended periods of time.

SUMMARY OF THE INVENTION

One object of the present invention is to provide a non-distorting helmet-mounted display utilizing a normal, non-rigidized helmet shell.

Another object of the present invention is to provide a normal helmet shell with an optical module comprising an optical projector and a visor mechanism. The optical module may also contain the electronics required to operate the display. A still further object of the invention is to provide attachment of the optical module to the helmet shell in a manner which prevents any stress arising at the shell from affecting the optical components.

The present invention accomplishes these objective by employing a relatively flexible shell having a relatively solid support construct symmetrically mounted near the top center of the helmet. Preferably, an optical projector is attached to the support. In this manner, distortions in the flexible shell do not transfer to the optical projector and the helmet need not be constructed out of rigid material. The optical projector projects an image onto a visor which is also mounted on the support, preferably on rotary mounts attached to relatively rigid extensions of the support that extend to the side of the helmet. Most preferably, the extensions are not attached to the helmet so as not to rigidify it. The visor is capable of pivotal motion about the rotary mounts.

In a preferred embodiment of the invention, the support construct is composed of two brackets. As shown in FIG. 1, a first mounting bracket is fastened substantially symmetrically near the top center of the helmet. The first mounting bracket preferably has a rectangular "hat"-shaped form, with the "brim" of the hat preferably symmetrically anchored to the curved surface of the shell in a number of places (preferably four). A second optical module bracket, preferably formed to match the shape of the first mounting bracket, is attached to the first mounting bracket and functions as an extension of the mounting bracket.

A further object of one aspect of the present invention is to prevent the visor from lifting upwards in the face of very strong wind pressure against the visor while simultaneously allowing the visor to lift upwards readily in the absence of wind pressure. A preferred embodiment of the present invention accomplishes this objective by providing a raised edge (hereinafter "ridge") preferably on the optical module bracket that prevents the visor from lifting upwards due to very strong wind pressure while simultaneously not obstructing the normal circumferential movement of the visor in the absence of wind pressure. Thus, the visor is prevented from lifting upwards without the use of visor fasteners.

BRIEF DESCRIPTION OF THE DRAWINGS

The present invention will be understood and appreciated more fully from the following detailed description, taken in conjunction with the drawings in which:

FIG. 3 is an illustration of the helmet of FIG. 2 further including a visor in accordance with a preferred embodiment of the present invention.

DETAILED DESCRIPTION OF PREFERRED EMBODIMENTS

Figure 1:
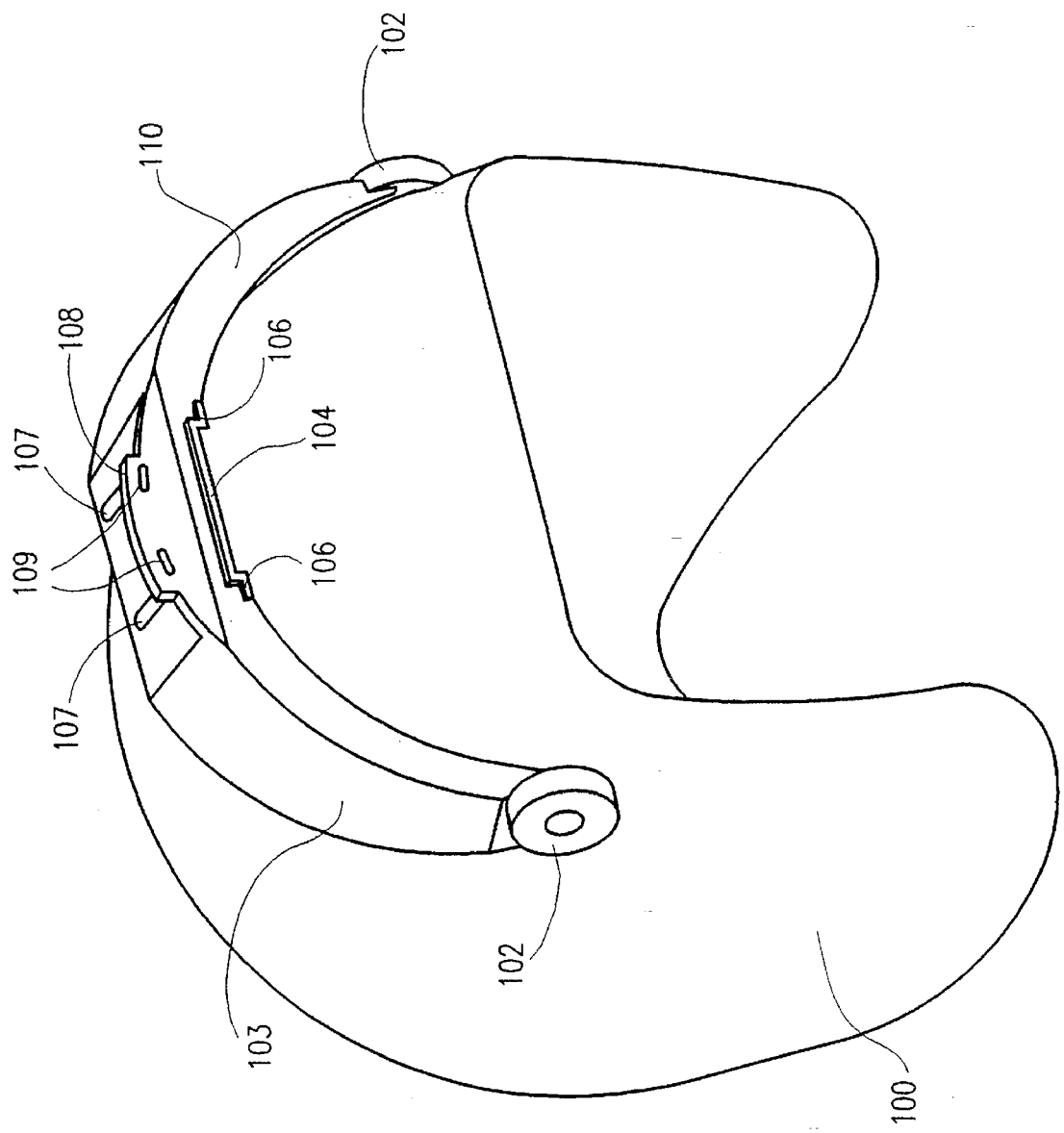
FIG. 1 is an illustration depicting a helmet with mounting brackets attached in accordance with a preferred embodiment of the present invention.

FIG. 1 shows a conventional helmet shell 100 which is constructed to be flexible and non-rigid. A mounting bracket 104 is fastened to helmet shell 100 at mounting points 106 at which points mounting bracket 104 is preferably curve-linearly shaped to have a smooth fit with the curved sphere of helmet shell 100. Mounting bracket 104 is preferably situated in the top center area of helmet shell 100 and is preferably symmetrically mounted on helmet shell 100. Since mounting points 106 are relatively near each other and situated near the top center of the helmet, mounting bracket 104 does not substantially increase the stiffness of the helmet.

A optical module bracket 110, preferably having its bottom formed to smoothly accept the shape of mounting bracket 104 and having extensions 103 which extend to the sides of the helmet, is fastened to mounting bracket 104 by screws passing through alignment slots 107. For clarity the screws are not shown. Preferably, extensions 103 are not attached to the helmet so as to be isolated from any stress arising from the shell and also not to rigidify the shell. Optical module bracket 110 functions as an extension of the support construct of mounting bracket 104. Preferably, optical module bracket 110 also contains rotary mounts 102, preferably at the ends of extensions 103.

A ridge 108, whose function will be described hereinbelow, is also preferably formed in optical module bracket 110, and is preferably situated in the top center portion of optical module bracket 110.

Figure 2:
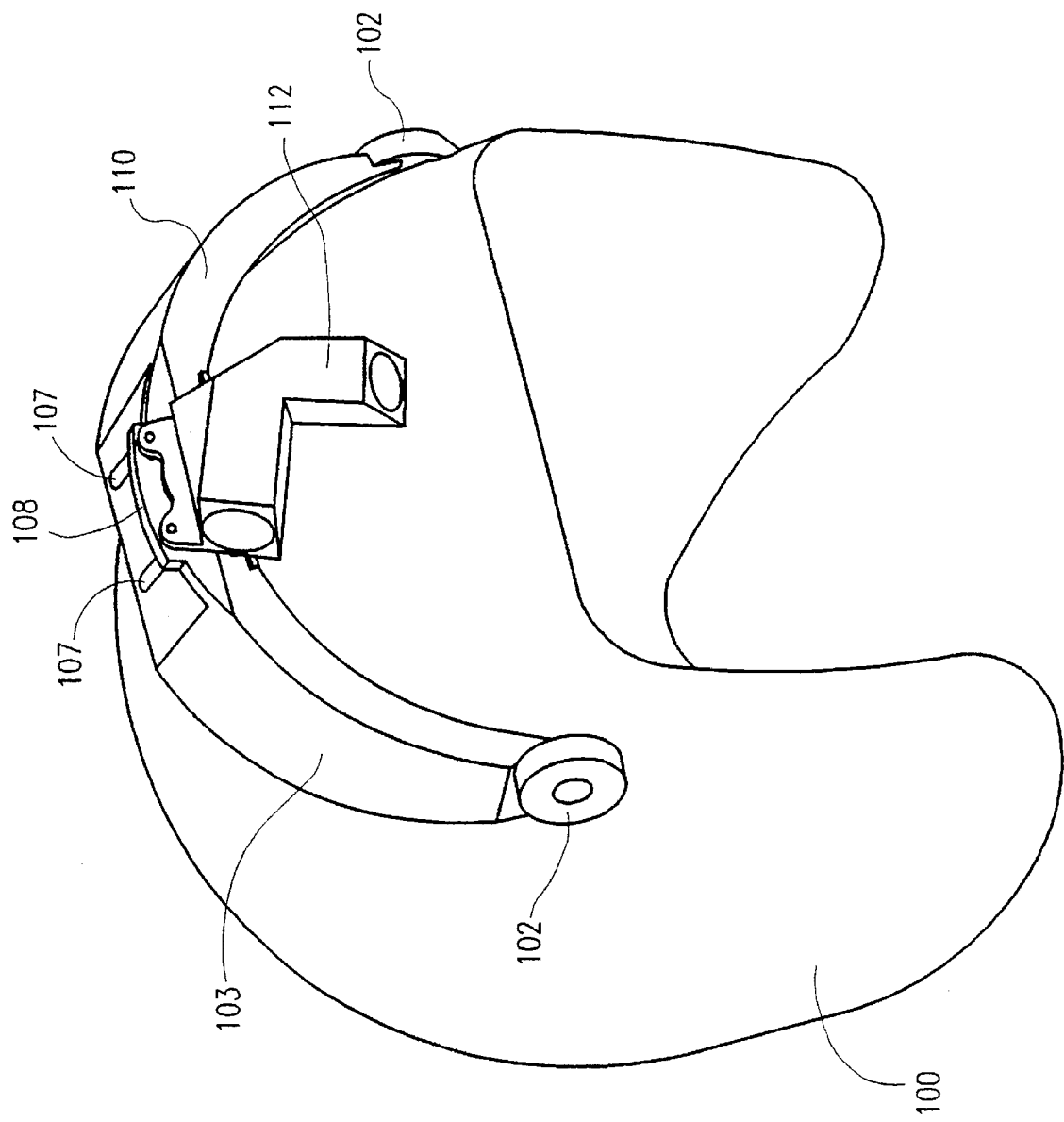
FIG. 2 is an illustration of the helmet of FIG. 1 with a display image source attached according to a preferred embodiment of the present invention.

Referring to FIG. 2, an optical projector 112, preferably including focusing optics, is mounted on optical module bracket 110 by screws which pass through alignment slots 109 (shown in FIG. 1).

Referring to FIG. 3, a visor 114 is connected to helmet shell 100 via two wings 116. The wings are attached to rotary mounts 102 (shown more clearly in FIG. 2), one on each end of extension 103, such that visor 114 can pivot around helmet shell 100. Optical projector 112 projects an image onto visor 114 for viewing by a pilot. Preferably, the present invention employs a display system utilizing optical projector 112 and visor 114 as described in Applicant's U.S. patent application Ser. No. 07/878,391, now U.S. Pat. No. 5,341,242, corresponding to Applicant's Israeli Patent Application number 099420.

Mounting brackets 104 and 110 to have a relatively solid construction so as to provide optical projector 112 with a relatively stable platform and a stable relationship with visor 114. Furthermore, by symmetrically placing mounting points 106, it is possible to transmit distortions emanating from one part of the shell, bypassing mounting bracket 104, to another part of the shell without affecting the relative stability of optical projector 112 and visor 114. In other words, distortions travel through the flexible material of helmet shell 100 without affecting the stability of mounting bracket 104. The net result is that a pilot sees an image relatively free of distortions arising from the helmet.

Figure 4A:
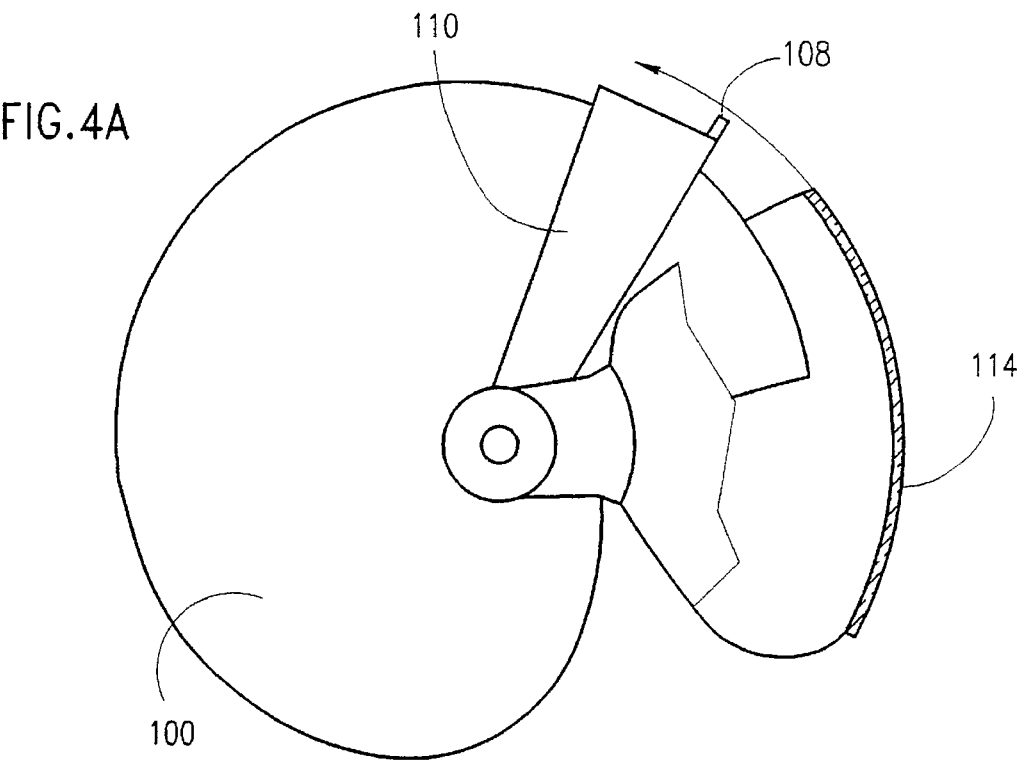
FIGS. 4A and 4B are illustrations depicting the use of a raised ridge on the helmet of FIGS. 1–3 in the absence of strong wind pressure against a visor and in the face of very strong wind pressure against a visor respectively, in accordance with a preferred embodiment of the present invention.
Figure 4B:
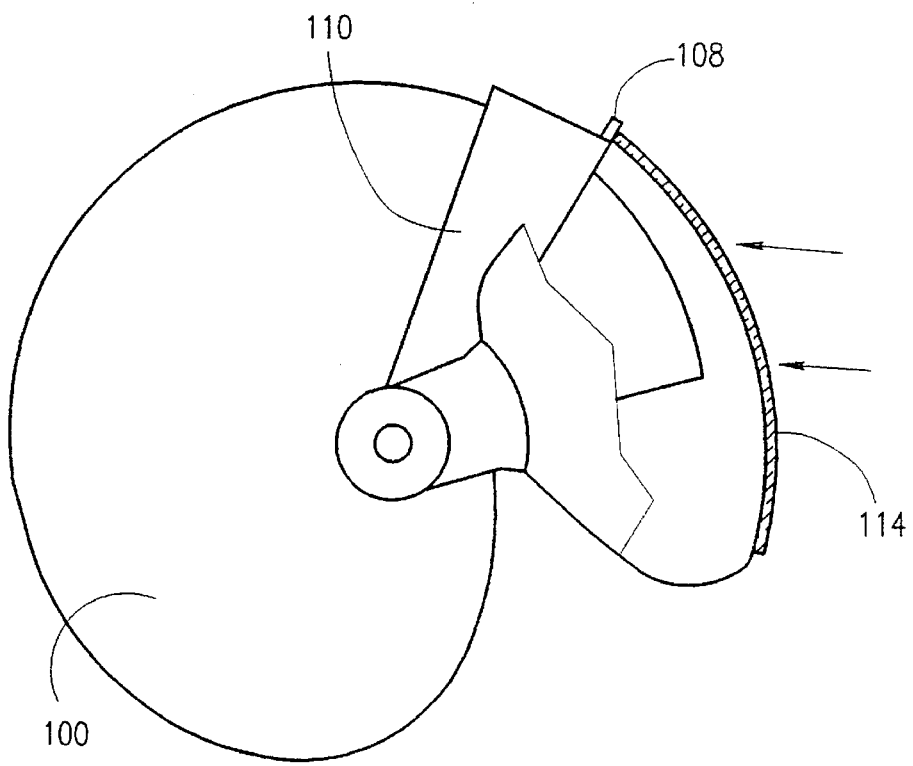

FIG. 4B illustrates the operation of ridge 108 in the face of very strong wind pressure against visor 114. The force due to very strong wind pressure, such as experienced at 300–600 miles per hour when an aircraft canopy ruptures, operates to push visor 114 toward helmet shell 100 as well as in an upward direction. As visor 114 is flattened against the helmet due to the strong wind pressure, visor 114 is blocked from lifting upwards due to the obstruction of ridge 108. In the absence of very strong wind pressure, visor 114, which is preferably constructed out of a relatively shape retaining material such as polycarbonate plastic, is not flattened against helmet shell 100 and can clear ridge 108 without difficulty so that the wearer of the helmet has no difficulty moving visor 114, as shown in FIG. 4A.

It should be appreciated that the aforementioned visor protection mechanism may be used alternatively or in addition to conventional visor-lifting prevention methods, such as visor fasteners.

As described above, in a preferred embodiment of the invention, bracket 110 is attached to bracket 104 by screws passing through alignment slots 107 and into screw holes in the bracket 104. Using this configuration the position of the optical module 112 (and thus the vertical position of the projected image on the visor) can be adjusted. Such adjustment is necessary to place the image in a desired position for viewing by the wearer of the helmet. To increase the range of adjustment, a plurality of sets of screw holes may be provided in bracket 104. In addition it is desirable to adjust the horizontal position of the image to take into account the distance between the eyes of the different wearers. This distance is conveniently adjusted, in accordance with a preferred embodiment of the invention, by adjusting the position of attachment of the optical module to bracket 110 using alignment slots 109.

It will be appreciated by persons skilled in the art that the present invention is not limited by what has been particularly shown and described herein. Rather, the scope of the present invention is defined only by the claims which follow:

We claim:

1. A helmet system having a visor attached to a support bracket mounted on a helmet wherein the support bracket is formed with an extension operative to block the visor from lifting upwards when the visor is pushed toward the helmet by wind pressure while not obstructing the normal circumferential movement of said visor in the absence of wind pressure.

2. A helmet system according to claim 1 and comprising a display image source attached to the support bracket which projects images onto the visor, wherein the position of the projected images is adjustably changed by changing the mounting position of the bracket on the helmet.

3. A helmet system according to claim 2 wherein an adjustment in the mounting position results in a vertical movement of the image on the visor.

4. A helmet system according to claim 3 wherein an adjustment in the mounting position results in a horizontal movement of the image on the visor.

5. A helmet system according to claim 2 wherein an adjustment in the mounting position results in a horizontal movement of the image on the visor.

6. A helmet system according to claim 1 wherein said visor is constructed out of a relatively shape retaining material.

7. A helmet system according to claim 6 wherein the relatively shape retaining material is polycarbonate plastic.

8. A helmet system according to claim 1 and comprising visor fasteners.

9. A helmet system comprising a helmet;

a visor attached to said helmet; and a ridge formed on said helmet operative to prevent said visor from lifting upwards when the visor is pushed toward the helmet by wind pressure while not obstructing the normal circumferential movement of said visor in absence of said wind pressure.

10. A helmet system according to claim 9 and comprising a display image source attached to a bracket which projects images onto the visor, wherein the position of the projected images is adjustably changed by changing the mounting position of the source on the helmet.

11. A helmet system according to claim 10 wherein an adjustment in the mounting position results in a vertical movement of the image on the visor.

12. A helmet system according to claim 10 wherein an adjustment in the mounting position results in a horizontal movement of the image on the visor.

13. A helmet system according to claim 10 wherein an adjustment in the mounting position results in a horizontal movement of the image on the visor.

14. A helmet system according to claim 9 wherein said visor is constructed out of a relatively shape retaining material.

15. A helmet system according to claim 14 wherein the relatively shape retaining material is polycarbonate plastic.

16. A helmet system according to claim 9 and comprising visor fasteners.

* * * * *